(12) United States Patent
Ito et al.

(10) Patent No.: US 6,699,580 B1
(45) Date of Patent: Mar. 2, 2004

(54) DISPERSION COMPOSITION FOR BLACK MATRIX, DISPLAY, AND PROCESS, FOR PRODUCTION DISPLAY

(75) Inventors: Takeo Ito, Kumagaya (JP); Koji Washiyama, Honjo (JP); Hajime Tanaka, Fujioka (JP); Tomoko Nakazawa, Maebashi (JP); Tsuyoshi Oyaizu, Fukaya (JP); Kazuo Sakai, Kawanishi (JP); Masaru Fukuda, Sanda (JP); Yoichi Inubushi, Toyonaka (JP)

(73) Assignees: Kabushiki Kaisha Toshiba, Kanagawa (JP); Fuji Pigment Co., Ltd., Hyogo (JP)

( * ) Notice: Subject to any disclaimer, the term of this patent is extended or adjusted under 35 U.S.C. 154(b) by 0 days.

(21) Appl. No.: 09/424,905

(22) PCT Filed: Apr. 1, 1999

(86) PCT No.: PCT/JP99/01720

§ 371 (c)(1),
(2), (4) Date: Dec. 1, 1999

(87) PCT Pub. No.: WO99/52122

PCT Pub. Date: Oct. 14, 1999

(30) Foreign Application Priority Data

Apr. 2, 1998 (JP) .......................... P10-090251

(51) Int. Cl.$^7$ .................................. B32B 5/16
(52) U.S. Cl. ................. 428/329; 428/330; 106/286.6
(58) Field of Search .................. 428/323, 328, 428/329, 330; 406/286.6

(56) References Cited

U.S. PATENT DOCUMENTS

| | | | | |
|---|---|---|---|---|
| 3,654,505 A | * | 4/1972 | Davis et al. ............. 313/92 B |
| 5,368,991 A | * | 11/1994 | Uchikawa et al. ........... 430/288 |
| 5,714,286 A | * | 2/1998 | Uchikawa et al. ............. 430/6 |
| 5,837,407 A | * | 11/1998 | Cho et al. ...................... 430/25 |
| 5,838,106 A | * | 11/1998 | Funada ........................ 313/587 |
| 5,840,450 A | * | 11/1998 | Cho ............................. 430/25 |
| 6,068,750 A | * | 5/2000 | Rasmussen ................. 204/490 |

FOREIGN PATENT DOCUMENTS

| | | |
|---|---|---|
| JP | 51-5856 | 2/1976 |
| JP | 54-19805 | 2/1979 |
| JP | 9-160243 | 6/1997 |
| KR | 1992-0007051 | 8/1992 |

* cited by examiner

*Primary Examiner*—H. Thi Le
(74) *Attorney, Agent, or Firm*—Pillsbury Winthrop LLP

(57) ABSTRACT

This dispersion liquid composition for black matrix comprises; manganese oxide having an average particle diameter in the range of 50 to 2000 nm, or solid solution of manganese oxide and ferric oxide having an average particle diameter in the range of 50 to 2000 nm and a manganese content in the range of 15 to 70% by weight; at least one kind of dispersing agent selected from a group of water-soluble acrylic resin, sodium salt, ammonium salt or potassium salt of water-soluble acrylic resin, and sodium salt, ammonium salt or potassium salt of polycarboxylic acid or ligninsulfonic acid or bisphenolsulfonic acid; and water, or a solvent mixture of water and an organic solvent compatible with water. By employing such a dispersion liquid composition for black matrix, light reflectivity of a light absorption layer of an interface with a panel is remarkably reduced. Accordingly, in a display device such as a color cathode ray tube, a display surface in which superposition of ambient light is difficult to occur is realized.

16 Claims, 9 Drawing Sheets

FIG. 7A
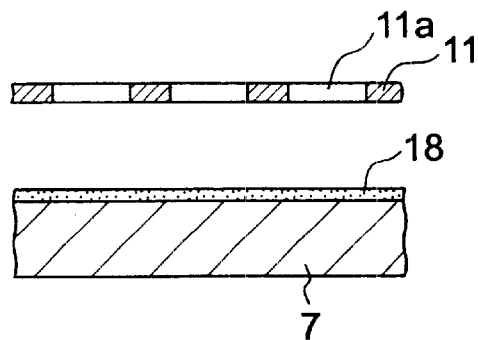
FIG. 7B
FIG. 7C
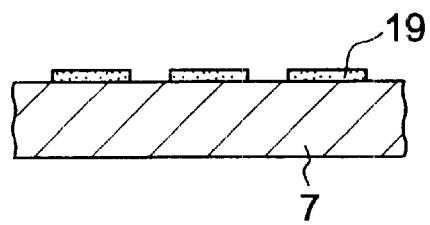
FIG. 7D
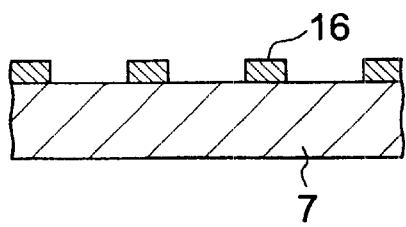
FIG. 7E
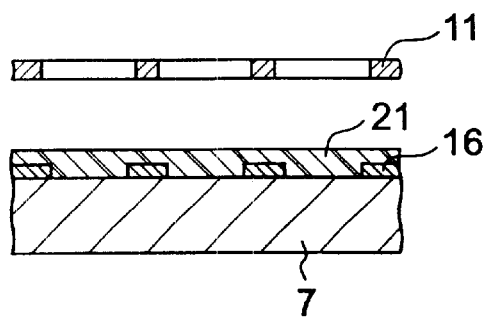
FIG. 7F
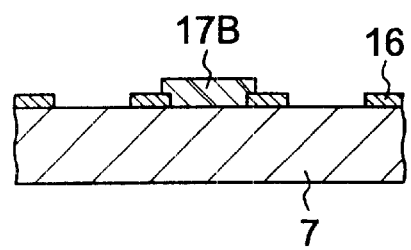
FIG. 7G
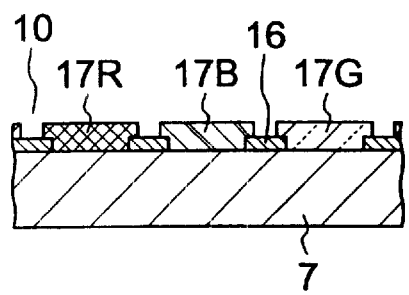

DISPERSION COMPOSITION FOR BLACK MATRIX, DISPLAY, AND PROCESS, FOR PRODUCTION DISPLAY

TECHNICAL FIELD

The present invention relates to a dispersion liquid composition being used for preparation of black matrix of a display surface of a display device such as a cathode ray tube, or similar device. In addition, the present invention relates to a display device such as a cathode ray tube, a plasma display panel (PDPs) and a field emission display (FED), and manufacturing method thereof.

BACKGROUND ART

In general, on an interior surface of a glass panel of a faceplate of a color cathode ray tube, a blue-emitting phosphor layer, green-emitting phosphor layer and red-emitting phosphor layer are disposed in dots or in stripes. By impinging an electron beam on the respective phosphor layers, the respective phosphors emit the respective colors to result in display of images.

On such a display surface of a color cathode ray tube, to enhance contrast through absorption of light from other than the respective phosphors, among phosphor dots or phosphor stripes that form adjacent pixels, a light absorption layer (black layer) is disposed as black matrix. Formation of the light absorption layer is performed, for example, in the following way. On an interior surface of a glass panel, photo-resist is coated, the coated photo-resist layer is exposed to a ultra-violet light beam through a shadow mask, and the exposed photo-resist layer is developed to form a resist pattern consisting of dots or stripes. Thereafter, thereon a dispersion liquid of a light absorptive substance is coated to bind, then with a decomposing agent such as hydrogen peroxide water, the resist layer and the layer of the light absorptive substance formed thereon are dissolved and separated to form the light absorption layer.

As the dispersion liquid of the light absorptive substance, as disclosed in Japanese Patent Application KOKOKU Publication No. 51(1976)-5856, water suspension that contains approximately 10% by weight of fine particles of graphite, approximately 1% by weight of a binder such as water glass, and a dispersing agent such as carboxymethyl cellulose is known.

However, in the display surface thereon the light absorption layer of which main component is graphite is formed, the light absorptive layer suppresses effectively diffusive reflection of ambient light but can not suppress sufficiently specular reflection thereof.

That is, in the light absorption layer that is formed by coating a dispersion liquid including graphite to bind, as shown in FIG. 11A, of light 52 incident from outside of the panel (glass panel) 51, the diffuse reflection light 54 that is approximately homogeneously reflected in all direction at an interface of the panel 51 and the light absorption layer 53 can be effectively reduced. However, as shown in FIG. 11B, the light 55 reflected specularly according to the law of reflection at the interface of the panel 51 and the light absorption layer 53 can not be reduced sufficiently. Accordingly, there was a problem that the ambient light such as fluorescent lamp is added on the display surface to cause a difficulty in observing the display surface.

The present invention is carried out to solve such problems. An object of the present invention is to provide a dispersion liquid composition for black matrix that enables to form a light absorption layer that, in a display surface of a display device such as a cathode ray tube, remarkably reduces reflectivity at the interface between a light absorption layer and a panel to make the ambient light less additive.

In addition, another object of the present invention is to provide a display device of which interface between the light absorption layer that is black matrix and the panel is reduced in reflectivity to make the ambient light less additive, and a manufacturing method thereof.

DISCLOSURE OF THE INVENTION

A first aspect of the present invention relates to a dispersion liquid composition for preparation of black matrix. The dispersion liquid composition comprises manganese oxide of an average particle diameter of 50 to 2000 nm, or solid solution of manganese oxide and ferric oxide of which an average particle diameter is in the range of 50 to 2000 nm and manganese content is in the range of 15 to 70% by weight, at least one kind of dispersing agent selected from a group of water soluble acrylic resin, sodium salt, ammonium salt or potassium salt of water soluble acrylic resin, sodium salt, ammonium salt or potassium salt of polycarboxylic acid or lignin sulfonic acid or bisphenol sulfonic acid, and water or an organic solvent compatible with water, respectively.

A second aspect of the present invention relates to a display device. A display device comprises a transparent panel, a light absorption layer disposed on an interior surface of a panel as black matrix, and phosphor layers disposed on a rear surface side opposing to the panel with respect to the light absorption layer. The light absorption layer contains, as the main component thereof, manganese oxide of an average particle diameter of in the range of 50 to 2000 nm, or solid solution of manganese oxide and ferric oxide of which average particle diameter is in the range of 50 to 2000 nm and manganese content is in the range of 15 to 70% by weight.

A third aspect of the present invention relates to a manufacturing method of the display device. The manufacturing method comprises a step of forming a light absorption layer as black matrix on an interior surface of a transparent panel, and a step of forming phosphor layers on the rear surface side opposing to the panel with respect to the light absorption layer. In the step of forming the light absorption layer, a dispersion liquid is coated on the interior surface of the panel to bind. Here, the dispersion liquid contains manganese oxide of an average particle diameter of in the range of 50 to 2000 nm, or solid solution of manganese oxide and ferric oxide of which average particle diameter is in the range of 50 to 2000 nm and manganese content is in the range of 15 to 70% by weight, at least one kind of dispersing agent selected from a group of water soluble acrylic resin, sodium salt, ammonium salt or potassium salt of water soluble acrylic resin, sodium salt, ammonium salt or potassium salt of polycarboxylic acid or lignin sulfonic acid or bisphenol sulfonic acid, and water or a mixed solvent of water and an organic solvent compatible with water.

In the present invention, as the light absorption substance, manganese oxide of which average particle diameter is controlled in the range of 50 to 2000 nm, or solid solution of manganese oxide and ferric oxide of which average particle diameter is controlled in the range of 50 to 2000 nm is employed. Manganese oxides can be manganese dioxide ($MnO_2$), dimanganese trioxide ($Mn_2O_3$), trimanganese tetroxide ($Mn_3O_4$), dimanganese heptoxide ($Mn_2O_7$), or similar compound. In particular, manganese dioxide is preferably employed.

In addition, manganese oxide or the solid solution of the manganese oxide and ferric oxide having such an average particle diameter is preferably included in the ratio of 0.5 to 60% by weight with respect to the total dispersion liquid, more preferable to be included in the ratio of 5 to 35% by weight. When the content of manganese oxide or the solid solution of manganese oxide and ferric oxide is less than 0.5% by weight of the total dispersion liquid, as the black matrix of the display device such as cathode ray tube, a light absorption layer (black layer) having sufficient light shielding property can be formed with difficulty. On the other hand, when the content exceeds 60% by weight, viscosity of the dispersion liquid becomes too high to coat uniformly on the panel even if an additive that will be described later is added.

Further, as a solid solution of manganese oxide and ferric oxide, one of which manganese content is more than 15% by weight can be employed. In particular, one of which manganese content is in the range of 15 to 70% by weight is preferably employed. The solid solution of which manganese content is less than 15% by weight, as the black matrix of the cathode ray tube or similar, is difficult to form a light absorption layer having sufficient light shielding property. On the other hand, when the manganese content of the solid solution exceeds 70% by weight, lowering effect of specular reflectance and diffuse reflectance becomes approximately equal with manganese oxide, that is, the advantage employing the solid solution with ferric oxide is lost.

By varying the average particle diameter of manganese oxide, and the solid solution of manganese oxide and ferric oxide, dispersion liquids including each of them were prepared, respectively. The prepared dispersion liquids were coated on the glass panels to form light absorption layers. The diffuse reflectance (Rr %) and specular reflectance (Rm %) were measured from the panel side and the results are shown in FIG. 1.

The light absorption layers were formed by coating the dispersion liquids containing 12% by weight of manganese dioxide ($MnO_2$) or solid solution of manganese dioxide and ferric oxide ($MnO_2.Fe_2O_3$), manganese content of which was 40% by weight, 0.6% by weight of ammonium salt of copolymer of acrylic acid-ethoxytriethyleneglycolmethacrylate, and 87.4% by weight of water, over the whole interior surface of glass panels of light transmittance of 80% with a thickness of 0.5 $\mu$m by a spin coat method and by drying them. Then, on this light absorption layer (an undercoat shielding layer), a blue phosphor slurry containing a blue-emitting phosphor (ZnS: Ag, Al) was coated by the spin coat method and dried to form a blue phosphor layer of a thickness of 15 $\mu$m.

Further, measurement of the diffuse reflectance (Rr %) and the specular reflectance (Rm %) was carried out by the following way. In the measurement of the diffuse reflectance, as shown in FIG. 2A, a sample panel having a light absorption layer 2 containing manganese dioxide or solid solution of manganese dioxide and ferric oxide on the interior surface of a glass panel 1 was disposed in a dark room with the exterior surface of the panel 1 directed toward an upper direction. Here, from an angle of 45° with respect to a normal line 1 established at the center of the panel, light of a fluorescent lamp 3 was irradiated. With a brightness-meter 4 disposed on the normal line 1, brightness of reflected light was measured relative to that of a reference white diffusing plate (reflectance of 99.9%). The measured value was converted into the absolute reflectance to obtain diffuse reflectance.

On the other hand, the measurement of the specular reflectance was performed in the way shown in FIG. 2B. As identical as the case of the diffuse reflectance, a sample panel was disposed in a dark room with the exterior surface of the panel 1 directed toward an upper direction. On this panel, from an angle of 45° with respect to a normal line 1 established at the center of the panel, light of a fluorescent lamp 3 was irradiated. The brightness of the reflected light was measured relative to that of the reference white plate by a brightness-meter 4 disposed on the opposite side of irradiation with an angle 45° with respect to the normal line 1. The measured value was converted into the absolute reflectance.

Further, with similar sample panels, light transmittances were measured and the results are shown in FIG. 3.

From the results shown in FIG. 1 and FIG. 3, the following is confirmed. That is, when the average particle diameter of $MnO_2$ or $MnO_2.Fe_2O_3$ in a dispersion liquid exceeds 2000 nm, the specular reflectance (Rm %) of the formed light absorption layer (black layer) increases remarkably. On the contrary, when the average particle diameter of $MnO_2$ or $MnO_2.Fe_2O_3$ is less than 50 nm, the light transmittance increases remarkably to deteriorate the light shielding property. Since, as a result of this, the emitted light from the phosphor layer goes astray to deteriorate color purity.

Further, when compared the light absorption layer including $MnO_2$ with the light absorption layer including $MnO_2.Fe_2O_3$ that is solid solution, in the range of an average particle diameter of 2000 nm or less, the latter one is superior to the former from the viewpoint of reduction of the specular reflectance and the diffuse reflectance.

In the dispersion liquid composition of the present invention, in order to disperse homogeneously manganese oxide or solid solution of manganese oxide and ferric oxide having such an average particle diameter in a solvent, and to prevent coagulation from occurring, a dispersing agent is added. As the dispersing agent, at least one kind selected from the group of water-soluble acrylic resins that are polymers or copolymers of acrylic acid, methacrylic acid or their derivatives, sodium salt, ammonium salt or potassium salt of said water-soluble acrylic resin, or sodium salt, ammonium salt or potassiun salt of polycarboxylic acid or lignin sulfonic acid or bisphenol sulfonic acid can be used.

Here, as derivatives of acrylic acid or methacrylic acid that constitute water-soluble acrylic resin, n-butyl methacrylate, benzil methacrylate, 2-phenylethylmethacrylate, ethoxytriethyleneglycolmethacrylate, ethoxyethylmethacrylate, butoxyethylmethacrylate, ethoxytriethylenemethacrylate, methoxypolyethyleneglycolmethacrylate, methylacrylate, ethylmethacrylate, isobutylmethacrylate, 2-ethylhexylmethacrylate, isodecylmethacrylate, n-laurylmethacrylate, tridecylmethacrylate, cyclohexylmethacrylate, 2-hydroxyethylmethacrylate, 2-hydroxypropylmethacrylate, dimethylaminoethylmethacrylate, diethylaminoethylmethacrylate, ethoxydiethyleneglycolacrylate, methoxydiethyleneglycolacrylate, methoxytriethyleneglycolacrylate, methoxydipropyleneglycolacrylate, phenoxyethylacrylate, phenoxypolyethyleneglycolacrylate, 2-hydroxyethylacrylate, 2-hydroxypropylacrylate, 2-acryloyloxyethyl succinic acid, 2-acryloyloxyethyl phtalic acid, 2-acryloyloxyethylhexahydro phtalic acid, 2-hydroxyethylacrylate, 2-hydroxypropylacrylate can be cited. Further, as commercial products of such water-soluble acrylic resins or the salts thereof, POLYFLOW No.90, POLYFLOW WS-30, FLOWLEN TG-730W (all of them are products of Kyoei Chemical Co.), AQUALIC HL-415 (product of Nihon Shokubai Co.) can be cited.

As another commercial dispersing agents, DEMOL EP (product of Kao Chemical Co.) that is polycarboxylate, VANILLEX N (product of Nihonseishi Co.) that is lignin sulfonate, VISPERSE P-121 (product of Nihonseishi Co.) that is bisphenolsulfonate, or similar product can be employed.

In the present invention, as the dispersing agent, water-soluble acrylic resin and its derivatives are preferable to employ, in particular, ammonium salt or sodium salt of the water-soluble acrylic resin is preferable to employ. Further, compounding amount of the dispersing agent is preferable to be in the range of 0.05 to 25% by weight to manganese oxide or the solid solution of manganese oxide and ferric oxide. When the compounding amount of the dispersing agent to manganese oxide or the solid solution of manganese oxide and ferric oxide is less than 0.05% by weight, particles of manganese oxide or particles of the solid solution tend to coagulate. Further, when the compounding amount of the dispersing agent exceeds 25% by weight, in addition to coagulation of manganese oxide particles or particles of the solid solution, pin-holes tend to occur in the formed light absorption layer to result in a problem.

In the present invention, as solvent, water alone, or solvent mixture prepared by mixing water and an organic solvent compatible with water can be employed. Here, as an organic solvent compatible with water, alcohols such as methanol, ethanol, and propanol, glycols such as ethylene-glycol and propylene-glycol, glycol-ethers such as propylene glycol monomethyl ether and propylene glycol monoethyl ether, and polar solvents such as 2-pyrrolidone, N-methyl-pyrrolidone, dimethylformamide, and dimethyl sulfoxide can be employed.

Further, to the dispersion liquid composition of the present invention, methyl-polysiloxane or dimethyl-polysiloxane that is denatured by alkylene oxide such as ethylene oxide or propylene oxide may be added. By adding such polysiloxanes, coating property to glass panel can be improved, thereby a black layer having homogeneity and uniform thickness can be formed.

In the present invention, among the aforementioned denatured polysiloxanes, it is desirable to employ one that has HLB (hydrophile-lypophile balance) value from 3 to 18. When the HLB value is less than 3, since compatibility between water and polysiloxane is not sufficient, sufficient improvement effect of the coating property of the dispersion liquid can not be obtained. Further, when the HLB value exceeds 18, foam occurs in the dispersion liquid to cause inhomogeneity in the coated layer.

As commercial denatured polysiloxanes to be added to improve the coating property, there are, for example, SIL-WET L-7001, Fz-7064, Fz-2165 (all of them are products of Nihonunicar Co.). Further, polyvinyl alcohol can be employed. Polyvinyl alcohol is preferable to employ, when the solid solution of manganese oxide and ferric oxide is employed.

Further, addition amount of such additives to the total of the dispersion liquid is desirable to be in the range of 0.05 to 0.5% by weight. When the addition amount is less than 0.05% by weight, the dispersion liquid is repelled by the panel such as glass or similar, accordingly there tends to occur spot like non-coated portions 5 (illustrated in FIG. 4A) in the light absorption layer 2. On the contrary, when the addition amount exceeds 0.5% by weight, the layer thickness of the light absorption layer 2 becomes non-uniform and there tends to appear steps 6 (illustrated in FIG. 4B) running radially from center portion to periphery portion. Therefore, in any cases, uniformity of image is deteriorated.

As the display device of the present invention, a color cathode ray tube, a field emission display (FED), a plasma display panel (PDP) or similar device can be cited.

The structures of these display devices will be described with reference to drawings.

A color cathode ray tube, as shown in FIG. 5, has an external envelope comprising a glass panel 7, that is a transparent panel, a funnel 8 and a neck 9. On an interior surface of the panel 7, there is disposed a phosphor screen 10 that will be described later, and further inside thereof, a shadow mask 11 is disposed opposed to the phosphor screen 10. On the other hand, inside the neck 9 of the external envelope, electron guns 13 that emit electron beams 12 are disposed. In addition, inside of the funnel 8, there is disposed an inner shield 14 for shielding the electron beams from an external magnetic field. Outside of the funnel 8, there is disposed a deflection device 15 for deflecting the electron beams 12 by a magnetic field generated thereby.

The phosphor screen 10, as shown in FIG. 6A and FIG. 6B, is constituted of a light absorption layer 16 formed in matrix formation, and phosphor layers 17B, 17G and 17R of respective colors of blue, green, and red arranged and formed regularly in holes of prescribed shape (for example, in circular dot formation) in the light absorption layer 16. The light absorption layer 16 includes manganese oxide of an average particle diameter of 50 to 2000 nm, or the solid solution of manganese oxide and ferric oxide of which average particle diameter is 50 to 2000 nm and of which manganese content is 15 to 70% by weight. In order to enhance color purity, between the phosphor layers 17 and the panel 7, optical filters corresponding to emission colors of the respective phosphor layers 17 may be interposed.

The phosphor screen 10 of such a color cathode ray tube can be manufactured through, for example, the following respective steps shown from FIG. 7A to FIG. 7G.

First, as shown in FIG. 7A, a photo-resist layer 18, after formed on the interior surface of a glass panel 7, is exposed through a shadow mask 11 and is hardened with a pattern corresponding to electron beam going through holes 11a of the shadow mask 11. Next, the photo-resist layer is developed and dried to let remain photo-cured layer 19 of dot shape at positions destined to form the phosphor layers (FIG. 7B).

Next, over the whole interior surface of the panel 7 thereon the photo-cured layer 19 is formed, the aforementioned dispersion liquid composition of the present invention is coated and dried to form a bound layer 20 of manganese oxide or solid solution of manganese oxide and ferric oxide, both of which are light absorption material (FIG. 7C). Thereafter, the photo-cured layer 19 is dissolved and peeled by a decomposing agent such as sulfamic acid and hydrogen peroxide water, thereby the bound layer 20 of the light absorption substance formed thereon is removed. Thereby, holes destined to form the phosphor layer are exposed. Thereby, the light absorption layer 16 with a prescribed pattern is formed (FIG. 7D).

Thereafter, on the interior surface of the panel 7 thereon the light absorption layer 16 is formed in matrix, a blue phosphor layer 17B, a green phosphor layer 17G, and a red phosphor layer 17R are formed in turn by a slurry method, respectively. In the slurry method, on the light absorption layer 16, a blue phosphor slurry, for example, is coated and dried to form a film 21 of the blue emitting phosphor over all the interior surface of the panel 7. Here, the blue phosphor slurry contains a blue emitting phosphor (ZnS: Ag, Al) and PVA (polyvinyl alcohol) and dichromate as its main components, and is added a surfactant. To this film 21 of the blue emitting phosphor, ultra-violet light is irradiated through the shadow mask 11 (FIG. 7E). The film 21, after exposed thus, is developed and followed by removal of non-cured portion by cleaning. Thereby, the blue phosphor layer 17B of dot shape is formed at the prescribed positions (FIG. 7F).

Following this, as identical as the blue phosphor layer 17B, the green phosphor layer 17G and the red phosphor layer 17R are formed sequentially. Thereby, on the interior surface of the panel 7, a light absorption layer 16 formed in matrix formation and a phosphor screen 10 comprising of blue phosphor layer 17B, green phosphor layer 17G, and red phosphor layer 17R all of which are formed in dots, are formed (FIG. 7G). Here, the green phosphor slurry contains a green emitting phosphor (ZnS: Cu, Al) and PVA (polyvinyl alcohol) and dichromate as its main components, and is added a surfactant. The red phosphor slurry contains a red emitting phosphor ($Y_2O_2S$:Eu) and PVA (polyvinyl alcohol) and dichromate as its main components, and is added a surfactant.

Next, as other examples of the display device of the present invention, the structure of a field emission display (FED) and a plasma display panel (PDP) will be described.

In the FED, as shown in FIG. 8, a substrate 21 of an electron emitting side and a substrate 22 of a light emitting side are disposed opposed each other in parallel to form a vacuum envelope. At the substrate 21 of the electron emitting side, on a silicon substrate 23, a film of silicon dioxide 25 having quite a many cavities 24 is formed. On this film of silicon dioxide 25, gate electrodes 26 consisting of Mo or Nb are formed, and on the silicon substrate 23 inside of the cavities 24, conic electron emitting elements 27 consisting of Mo are formed.

Further, at the substrate 22 of the light emitting side, on a surface of a transparent glass substrate 28 opposed to the electron emitting elements 27, a phosphor screen 10 is formed. The phosphor screen 10 comprises, as shown in FIG. 9, a light absorption layer 16 formed in matrix, and a phosphor layer 17 of blue emitting, green emitting, and red emitting phosphors arranged and formed regularly in holes of prescribed shape of the light absorption layer 16. The light absorption layer 16 contains, as the light absorption substance, manganese oxide of an average particle diameter of 50 to 2000 nm, or solid solution of manganese oxide and ferric oxide of which average particle diameter is in the range of 50 to 2000 nm and of which manganese content is in the range of 15 to 70% by weight. Further, to support the load on the silicon substrate 23 added by weight of the phosphor screen 10 and the glass substrate 28 and atmospheric pressure, there is disposed a supporting member 29 between the substrate 21 of the electron emitting side and the substrate 22 of the light emitting side.

In this display device, electron beams emitted from many of the electron emitting elements 27 are irradiated on the phosphor screen 10, thereby the respective phosphor layers 17 of the phosphor screen 10 emit light to display images. This phosphor screen 10 (the light absorption layer 16 and the respective phosphor layers 17) of the FED is also manufactured in an identical manner as, for example, that of the aforementioned phosphor screen of the color cathode ray tube.

Further, in an AC type PDP that is a third example of the display device of the present invention, as shown in FIG. 10, two glass substrates 30 and 31 of the rear side and the front side are disposed in parallel and opposed each other. They are supported a certain distance apart by a plurality of cell walls 32 disposed in parallel each other on the rear side glass substrate 30.

On the rear surface of the glass substrate 31 of the front side, a light absorption layer 16, and a composite electrode 35 constituted of a transparent electrode 33, that is a supporting electrode, and a metallic electrode 34, that is a bus electrode, are formed in parallel each other. In addition, covering the composite electrode 35, a dielectric substance layer 36 is formed, and further thereon a protective layer (MgO layer) 37 is formed.

On the other hand, on the front surface of the glass substrate 30 of the rear side, to be orthogonal with the composite electrodes 35, address electrodes 38 are formed located between the cell walls 32. Further, so as to cover over the address electrodes 38, the phosphor layer 17 is disposed.

In manufacturing a PDP having such a structure, on the glass substrate 31 of the front side, as identical way as that of the aforementioned color cathode ray tube, a light absorption layer 16 can be formed. In addition, formation of the phosphor layer on the glass substrate 30 of the rear side also can be performed as identical as the formation of the phosphor layer of the aforementioned color cathode ray tube.

BRIEF DESCRIPTION OF DRAWINGS

FIG. 7A, FIG. 7B, FIG. 7C, FIG. 7D, FIG. 7E, FIG. 7F and FIG. 7G are sectional diagrams showing respective steps of forming the aforementioned phosphor screen.

MODES FOR CARRYING OUT THE INVENTION

Figure 1:
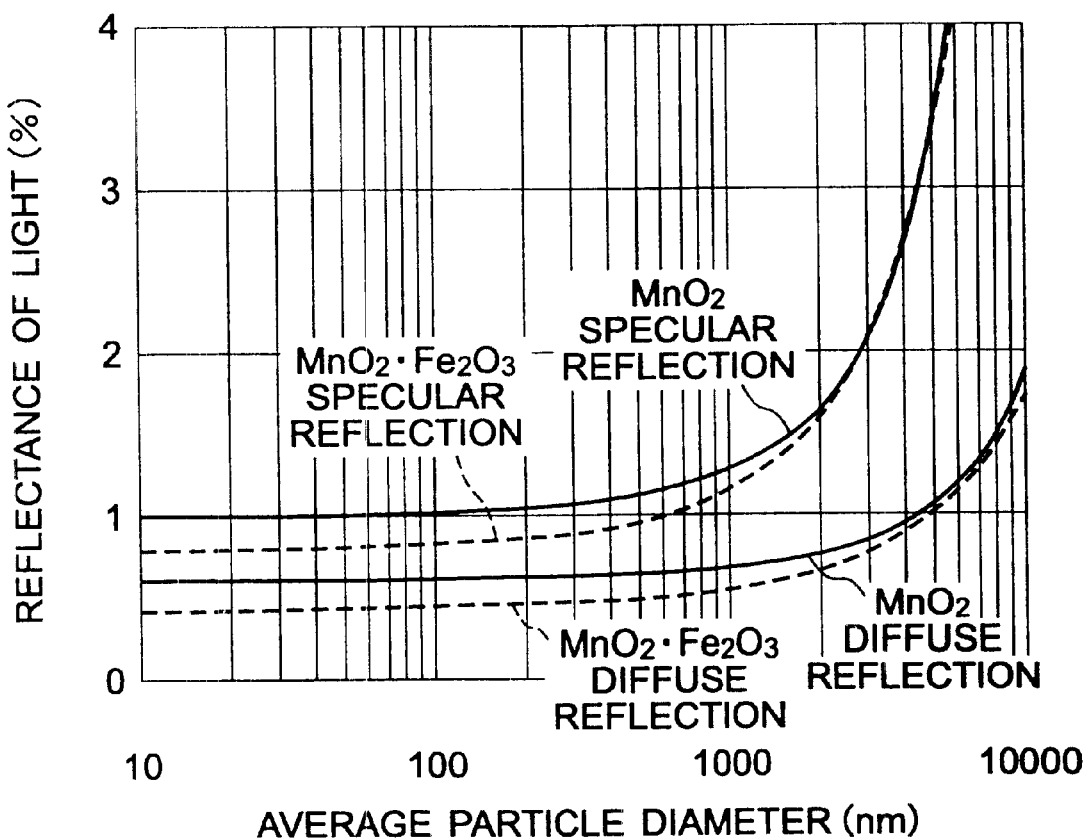
FIG. 1 is a diagram showing relationship between average particle diameter of manganese oxide, or average particle diameter of solid solution of manganese oxide and ferric oxide, and diffuse reflectance (Rr %) and specular reflectance (Rm %) of light absorption layer formed from dispersion liquid containing respective light absorption substances.

In the following, the preferred embodiments of the present invention will be described.

Embodiments 1 to 5

With dispersing agents shown in table 1, dispersion liquids of manganese dioxide ($MnO_2$) or solid solution of manganese dioxide and ferric oxide ($MnO_2.Fe_2O_3$) of the following compositions were prepared.

[Composition of Dispersion Liquid]

| | |
|---|---|
| $MnO_2$ (average particle diameter of 400 nm) or $MnO_2.Fe_2O_3$ (average particle diameter of 100 nm) | 20.0% by weight |
| dispersing agent | 1.0% by weight |
| water | 79.0% by weight |

With the obtained dispersion liquids, quality of dispersion and stability of dispersion were checked, respectively. In addition, coating property of the dispersion liquids and hiding power and heat-resistance of coated films were checked, respectively.

In evaluating quality of dispersion, whether manganese dioxide or the solid solution of manganese dioxide and ferric oxide was coagulated or not was checked. In evaluating stability of dispersion state, whether the dispersed state could be stable for a long time or the dispersion liquid separated into its components was checked. Further, in checking coating property, whether the coated film was uniform or not was checked, and in testing heat-resistance, the coated film was baked in a furnace at 450° C. for 1 hour, thereafter, the change of the coated film before and after the baking was checked. The results of judgement are shown by designating ◎ for very good level, ○ for good level, and Δ for practically no-problem level. Further, in the test of hiding power, whether the coated film hides the under-layer or not is checked. The results of judgement are shown by designating ○ for complete hiding of the under-layer, and Δ for a little transparency but practically no-problem.

Next, these dispersion liquids were coated over the whole interior surface of the glass panels of light transmittance of 70% by the spin coating method and dried to form light absorption layers. Thereafter, on the light absorption layer, a slurry containing a blue emitting phosphor (ZnS: Ag, Al) was coated by the spin coating method and was dried to form the blue phosphor layer. Thereafter, the diffuse reflectance (Rr %) and the specular reflectance (Rm %) were measured from the glass panel side with the method described above. These results of measurement are shown in Table 1 together with the evaluation results of dispersion quality of the dispersion liquids, coating property and heat-resistance.

In the table, in embodiments 1 and 5, as ammonium salt of acrylic acid copolymer, ammonium salt of acrylic acid-n-buthyl methacrylate copolymer was employed, and in embodiment 2, as sodium salt of acrylic acid copolymer, sodium salt of acrylic acid-n-lauryl methacrylate copolymer was employed. Further, in embodiment 3, commercial DEMOL Ep that was sodium carboxylate was employed, and in embodiment 4, commercial VANILLEX N that was sodium lignin sulfonate was employed.

For comparison purpose, as the dispersing agent, carboxyl methylcellulose (comparative example 1) and β-sodium naphthalenesulfonate (comparative example 2) were employed, respectively, and the dispersion liquids were prepared with the composition as same as those of embodiments 1 through 5. They did not produce ones in which manganese oxide was dispersed uniformly. Therefore, they could not form practically useful coated films.

Further, as comparative example 3, a dispersion liquid was prepared with a existing combination of graphite and a dispersing agent (carboxylmethylcellulose) to evaluate dispersion property (dispersion quality and stability of liquid) and coating property of the dispersion liquid, respectively. Further, with the obtained dispersion liquid of graphite, the light absorption layer was formed by the same way as that of embodiments 2 through 5. Thereafter, the diffuse reflectance and the specular reflectance of the obtained light absorption layer were evaluated with the same method. These results are also shown in Table 1.

TABLE 1

| | Embodiment 1 | Embodiment 2 | Embodiment 3 | Embodiment 4 | Embodiment 5 | Comparative example 3 |
|---|---|---|---|---|---|---|
| | Dispersion liquid | | | | | |
| Light absorbing substance | $MnO_2$ | $MnO_2$ | $MnO_2$ | $MnO_2$ | $MnO_2.Fe_2O_3$ | Graphite |
| Dispersing agent | Ammonium salt of acrylic acid copolymer | Na salt of acrylic acid copolymer | Na poly-carboxylate | Na lignin-sulfonate | Ammonium salt of acrylic acid copolymer | Carboxylmethyl-cellulose |
| Quality of dispersion | ◎ | ◎ | ◎ | ○ | ◎ | ○ |
| Stability of dispersion | ◎ | ○ | ○ | ○ | ◎ | ○ |
| Coating property | Δ | Δ | Δ | Δ | ○ | ○ |
| Hiding power | ○ | ○ | ○ | ○ | Δ | ○ |
| Heat-resistance | Δ | Δ | Δ | Δ | ○ | Δ |

TABLE 1-continued

|  | Embodiment 1 | Embodiment 2 | Embodiment 3 | Embodiment 4 | Embodiment 5 | Comparative example 3 |
|---|---|---|---|---|---|---|
| Diffuse reflectance (%) | 2.90 | 3.05 | 2.95 | 3.10 | 2.17 | 3.87 |
| Specular reflectance (%) | 1.32 | 1.44 | 1.56 | 1.72 | 0.63 | 3.17 |

Embodiment 6

With the following composition, a manganese dioxide dispersed liquid was prepared.

[Composition of Dispersion Liquid]

| | |
|---|---|
| $MnO_2$ (average particle diameter 400 nm) | 20.0% by weight |
| ammonium salt of acrylic acid-ethoxy triethylene glycol methacrylate copolymer | 1.0% by weight |
| water | 79.0% by weight |

Next, with this dispersion liquid and with the known method, black matrix (light absorption layer) of a color cathode ray tube was formed, and thereafter phosphor layers were formed.

On the interior surface of a glass panel of a faceplate, photo-resist was coated, and the photo-resist layer was exposed through a shadow mask and developed to form a resist-pattern formed in dots at positions where phosphor layer is destined to form. Thereafter, thereon the aforementioned dispersion liquid of manganese dioxide was coated by the spin coating method and dried. Then, with decomposing agent such as sulfamic acid, hydrogen peroxide or similar agent, the resist layer and the light absorption layer formed thereon were dissolved and peeled to form the black matrix.

Next, on the interior surface of the panel that had been heated in advance, a blue phosphor slurry was coated by the spin coating method and dried with a heater to form a film of the blue emitting phosphor over the whole interior surface of the panel. Here, the blue phosphor slurry contained a blue emitting phosphor (ZnS: Ag, Al) and PVA and dichromate as its main components, and a surfactant as an additive. Then, this film was exposed to ultra-violet light through a shadow mask and developed. Thereafter, by removing the non-cured portion by cleaning, the blue phosphor layer of prescribed dot pattern was formed. Then, as same as the blue phosphor layer, the green phosphor layer and the red phosphor layer were formed in turn. Thus, on the interior surface of the panel, the light absorption layer, and the phosphor screen consisting of blue, green and red phosphor layers, were formed. The green phosphor slurry contained a green emitting phosphor (ZnS: Cu, Al) and PVA and dichromate as its main components, and a surfactant, and the red phosphor slurry contained a red emitting phosphor ($Y_2O_2S$:Eu) and PVA and dichromate as its main components, and a surfactant.

Figure 2A:
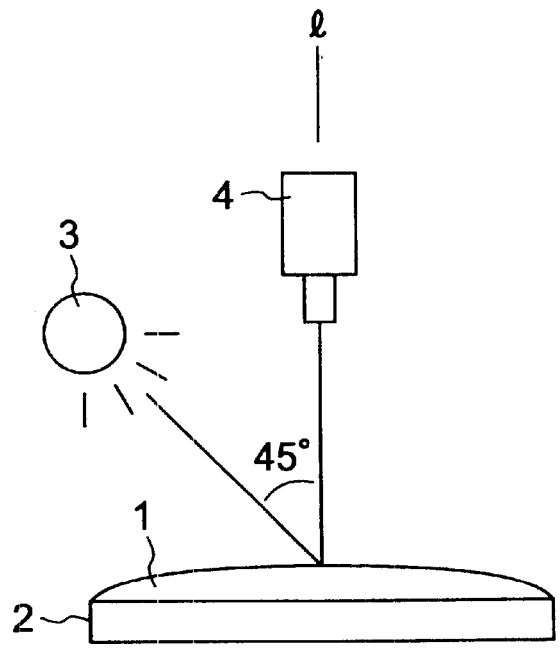
FIG. 2A and FIG. 2B are diagrams showing schematically measurement methods of diffuse reflectance and specular reflectance.
Figure 2B:
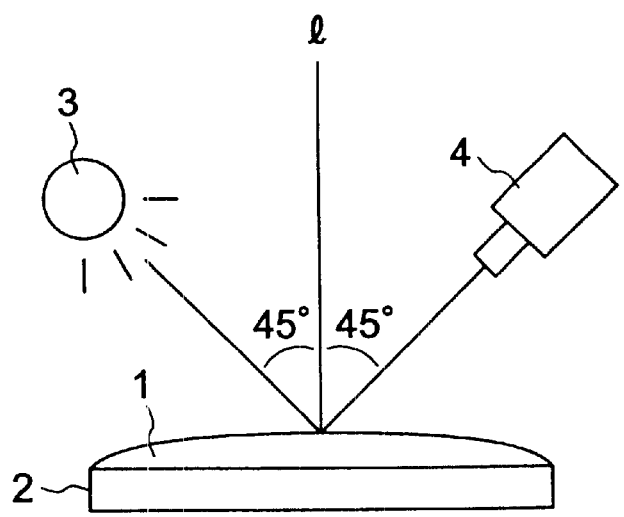
Figure 3:
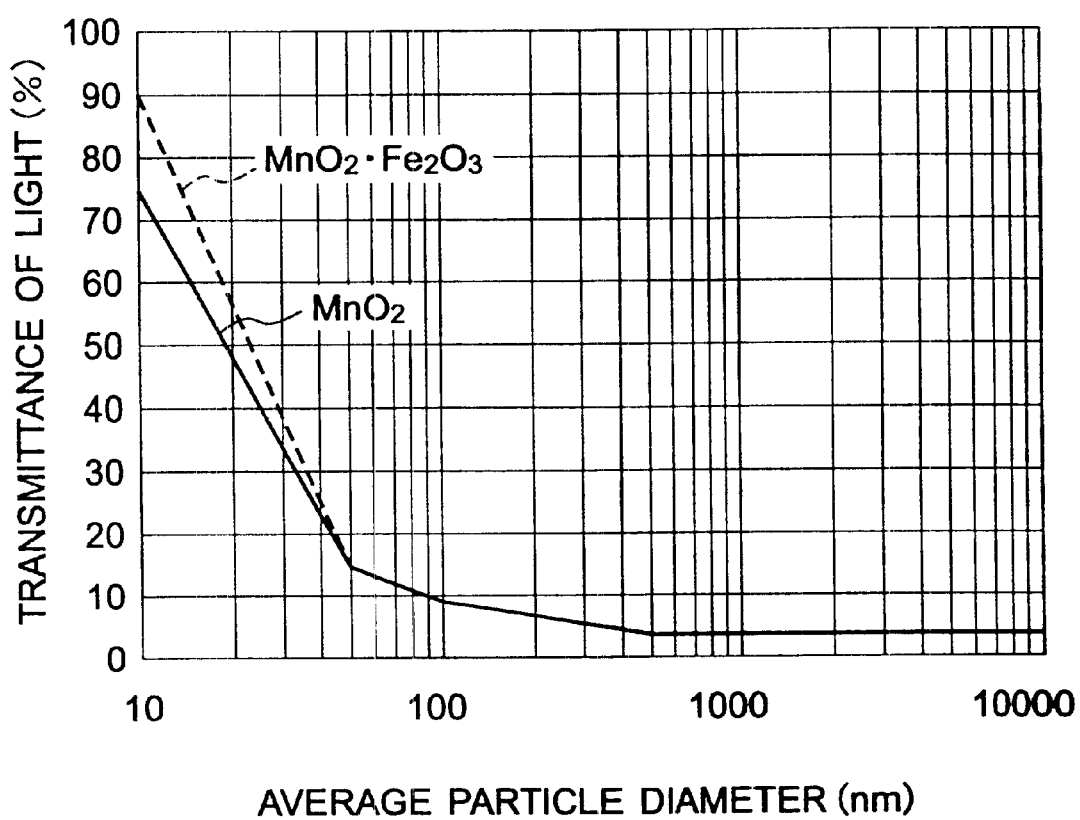
FIG. 3 is a diagram showing relationship between average particle diameter of manganese oxide, or average particle diameter of solid solution of manganese oxide and ferric oxide, and light transmittance of sample panel.
Figure 4A:
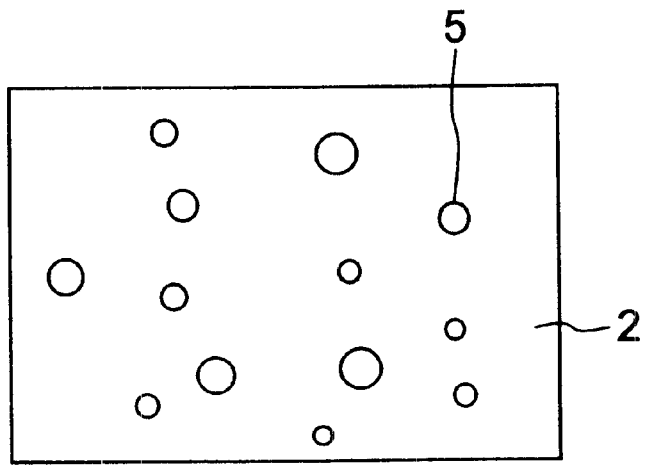
FIG. 4A and FIG. 4B are plan views showing schematically patterns of irregularity occurring in light absorption layer.
Figure 4B:
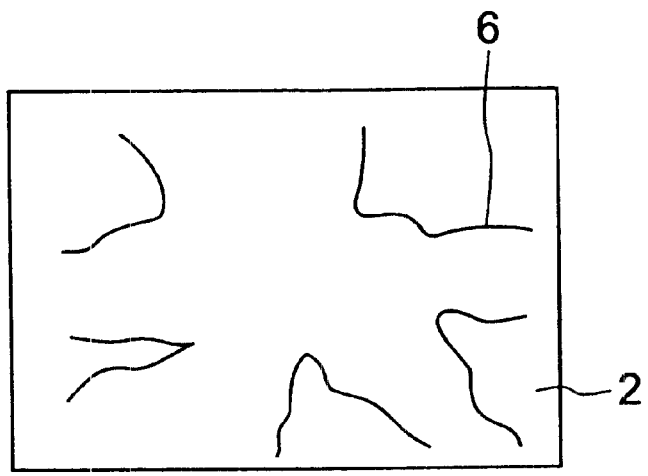
Figure 5:
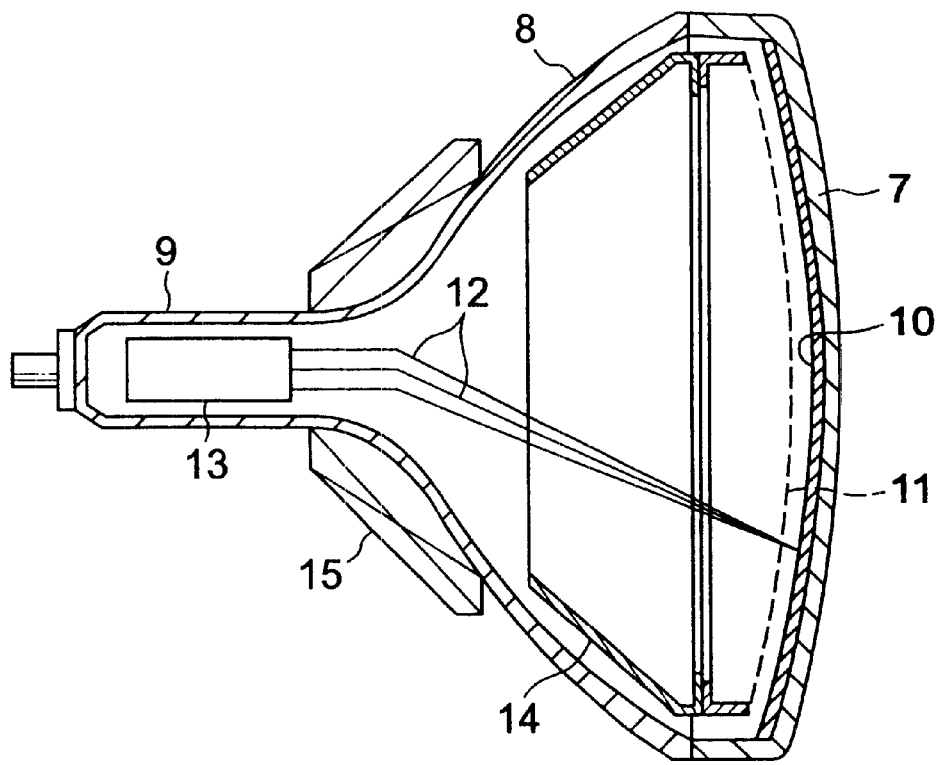
FIG. 5 is a sectional diagram showing a constitution of a color cathode ray tube of a first example of a display device of the present invention.
Figure 6A:
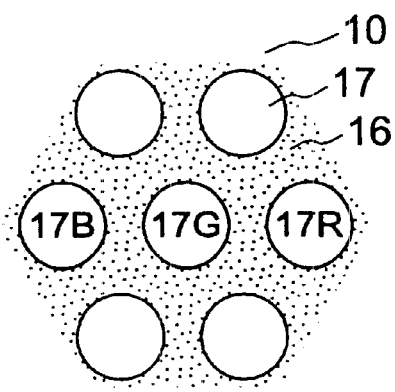
FIG. 6A and FIG. 6B are a plan view and a sectional diagram showing an example of a constitution of a phosphor screen in the color cathode ray tube.
Figure 6B:
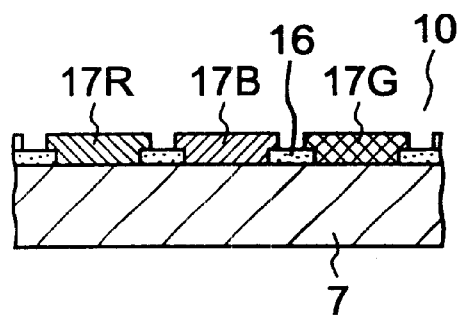
Figure 8:
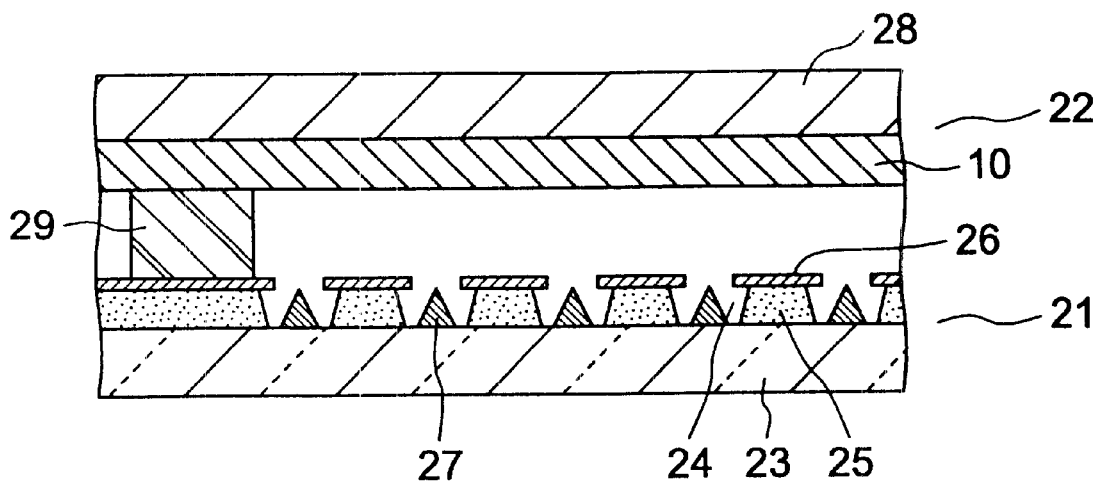
FIG. 8 is a sectional diagram showing a constitution of a FED that is a second example of a display device of the present invention.
Figure 9:
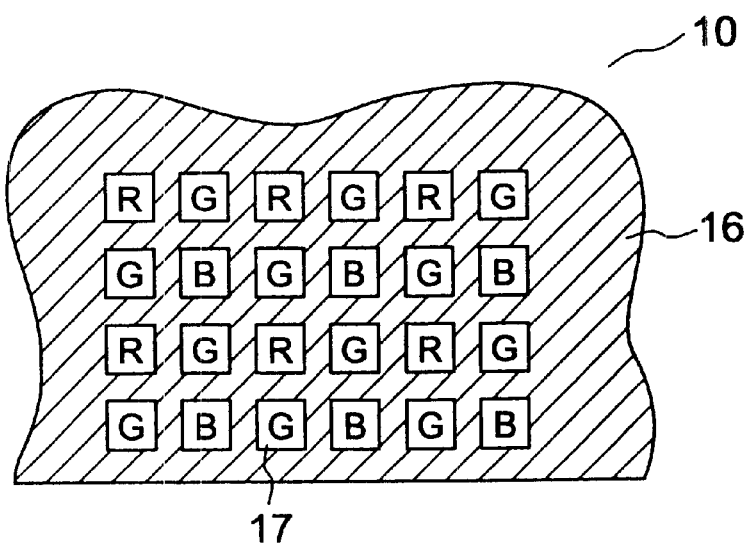
FIG. 9 is a plan view showing an example of a constitution of a phosphor screen in the FED.
Figure 10:
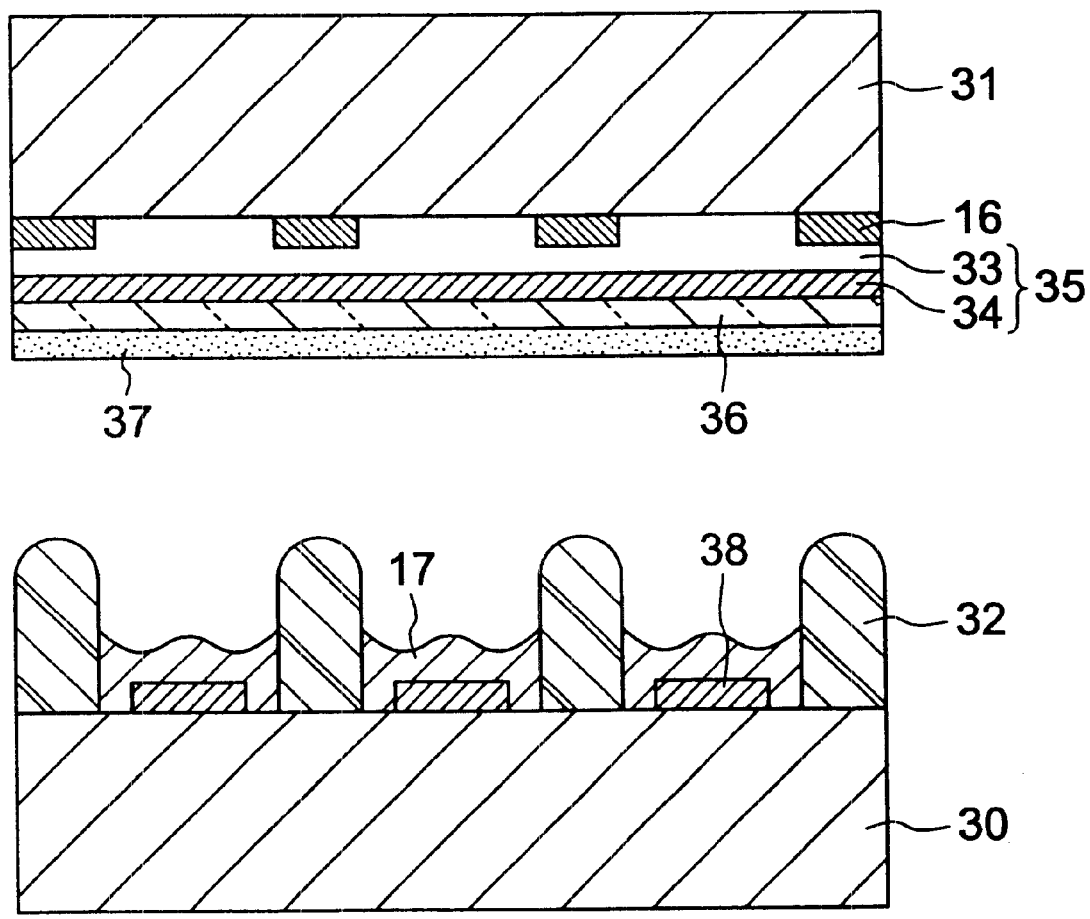
FIG. 10 is a sectional diagram showing a constitution of a PDP that is a third example of a display device of the present invention.
Figure 11A:
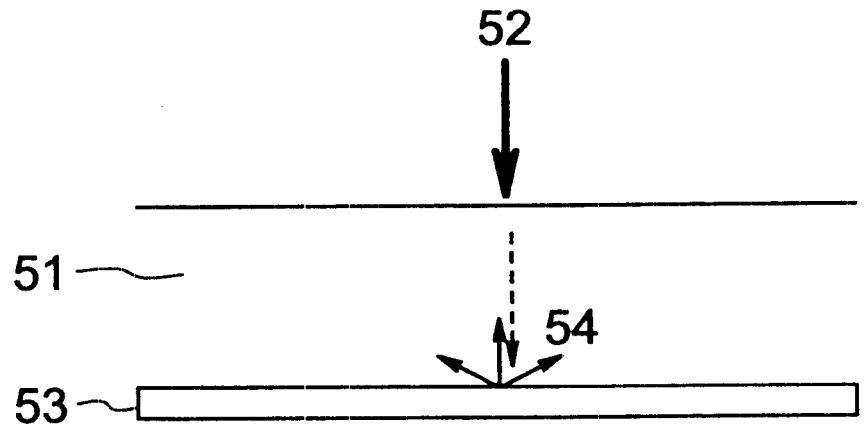
FIG. 11A and FIG. 11B are diagrams showing schematically difference of diffuse reflectance and specular reflectance.
Figure 11B:
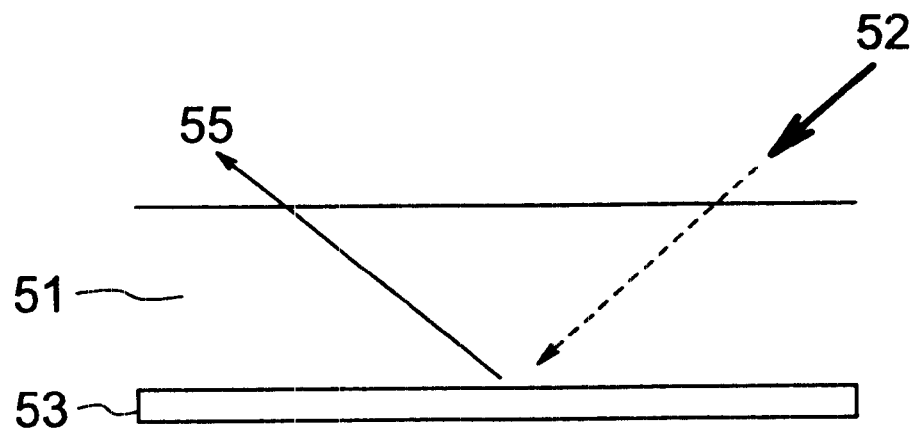

In thus prepared color cathode ray tubes, the diffuse reflectance (Rr %) and the specular reflectance (Rm %) of display surface were evaluated from external surface side of the glass panel by the method shown in FIG. 2. The diffuse reflectance was 2.9% and the specular reflectance was 1.3%. These values were remarkably lower than the diffuse reflectance of 3.9% and the specular reflectance of 3.2% of the display surface (black matrix was graphite layer) of the existing color cathode ray tube. Since reflectivity of the display surface was remarkably reduced, it showed an improvement effect.

Embodiment 7

With the following composition, a dispersion liquid of $MnO_2$ was prepared.

[Composition of Dispersion Liquid]

| | |
|---|---|
| $MnO_2$ (average particle diameter 400 nm) | 20.0% by weight |
| ammonium salt of methacrylic acid-dimethylamino-methyl methacrylate copolymer | 1.5% by weight |
| water | 78.4% by weight |
| alkyleneoxide denatured methylpolysiloxane | 0.1% by weight |

Next, with this dispersion liquid, with the method identical as that of embodiment 6, black matrix of a color cathode ray tube was formed and, thereafter, phosphor layers were formed.

The dispersion liquid of this embodiment, being excellent in its coating property to the panel, could form a light absorption layer of uniform thickness without producing irregularity. With thus prepared color cathode ray tube, the diffuse reflectance and the specular reflectance of the display surface were measured from the external surface side of the glass panel as same as embodiment 6. Those values were remarkably lower than those of the display surface of the existing color cathode ray tube. Thus, the reflectivity of the display surface was remarkably reduced to result in showing an improvement.

Embodiment 8

With the following composition, a dispersion liquid of $MnO_2$ was prepared.

[Composition of Dispersion Liquid]

| | |
|---|---|
| $MnO_2$ (average particle diameter 100 nm) | 20.0% by weight |
| ammonium salt of methacrylic acid-dimethylamino-methyl methacrylate copolymer | 1.5% by weight |
| water | 78.4% by weight |
| polyvinyl alcohol | 0.1% by weight |

Next, with this dispersion liquid, with the method identical as that of embodiment 6, black matrix of a color cathode ray tube was formed and, thereafter, phosphor layers were formed.

The dispersion liquid of this embodiment, being excellent in its coating property to the panel, could form a light absorption layer of uniform thickness without producing irregularity. With thus prepared color cathode ray tube, the diffuse reflectance and the specular reflectance of the display surface were measured from the external surface side of the glass panel as same as embodiment 6. Those values were remarkably lower than those of the display surface of the existing color cathode ray tube. Thus, the reflectivity of the display surface was remarkably reduced to result in showing an improvement.

Embodiment 9

With the following composition, a dispersion liquid of $MnO_2$ was prepared.

[Composition of Dispersion Liquid]

| | |
|---|---|
| $MnO_2$ (average particle diameter 1000 nm) | 22.0% by weight |
| ammonium salt of methacrylic acid-dimethylamino-methyl methacrylate copolymer | 1.5% by weight |
| water | 76.4% by weight |
| alkyleneoxide denatured methylpolysiloxane | 0.1% by weight |

Next, with this dispersion liquid, with the method identical as that of embodiment 6, black matrix of a color cathode ray tube was formed and, thereafter, phosphor layers were formed.

The dispersion liquid of this embodiment, being excellent in its coating property to the panel, could form a light absorption layer of uniform thickness without producing irregularity. With thus prepared color cathode ray tube, the diffuse reflectance and the specular reflectance of the display surface were measured from the external surface side of the glass panel as same as embodiment 6. Those values were remarkably lower than those of the display surface of the existing color cathode ray tube. Thus, the reflectivity of the display surface was remarkably reduced to result in showing an improvement.

Embodiment 10

With the following composition, dispersion liquid of solid solution of manganese dioxide and ferric oxide ($MnO_2 \cdot Fe_2O_3$) was prepared.

[Composition of Dispersion Liquid]

| | |
|---|---|
| $MnO_2 \cdot Fe_2O_3$ (average particle diameter 100 nm) | 20.0% by weight |
| ammonium salt of methacrylic acid-dimethylamino-methyl methacrylate copolymer | 1.5% by weight |
| water | 78.4% by weight |
| polyvinyl alcohol | 0.1% by weight |

Next, with this dispersion liquid and the method identical as embodiment 6, black matrix of a color cathode ray tube was formed and, thereafter, phosphor layers were formed.

The dispersion liquid of this embodiment was further superior in its coating property to the panel to the $MnO_2$ dispersion liquid employed in embodiment 7, accordingly, a light absorption layer of irregularity-free and uniform thickness was formed. With a color cathode ray tube thus prepared, the diffuse reflectance and the specular reflectance were measured from the external surface side of the panel as same as embodiment 6. The obtained values were remarkably lower than those of the display surface of the existing color cathode ray tube. Reflectivity of the display surface was remarkably reduced to result in showing an improvement.

Embodiment 11

With the following composition, dispersion liquid of solid solution of manganese dioxide and ferric oxide ($MnO_2 \cdot Fe_2O_3$) was prepared.

[Composition of Dispersion Liquid]

| | |
|---|---|
| $MnO_2 \cdot Fe_2O_3$ (average particle diameter 400 nm) | 20.0% by weight |
| ammonium salt of acrylic acid-ethoxy triethylene glycol methacrylate copolymer | 1.0% by weight |
| water | 79.0% by weight |

Next, with this dispersion liquid and the method identical as embodiment 6, black matrix of a color cathode ray tube was formed and, thereafter, phosphor layers were formed.

The dispersion liquid of this embodiment, being excellent in its coating property to the panel, could form a light absorption layer of uniform thickness without producing irregularity. With thus prepared color cathode ray tube, the diffuse reflectance and the specular reflectance of the display surface were measured from the external surface side of the glass panel as same as embodiment 6. Those values were remarkably lower than those of the display surface of the existing color cathode ray tube. Thus, the reflectivity of the display surface was remarkably reduced to result in showing an improvement.

Embodiment 12

With the following composition, dispersion liquid of solid solution of manganese dioxide and ferric oxide ($MnO_2 \cdot Fe_2O_3$) was prepared.

[Composition of Dispersion Liquid]

| | |
|---|---|
| $MnO_2 \cdot Fe_2O_3$ (average particle diameter 1000 nm) | 20.0% by weight |
| ammonium salt of methacrylic acid-dimethylamino-methyl methacrylate copolymer | 1.5% by weight |
| water | 78.4% by weight |
| alkyleneoxide denatured methylpolysiloxane | 0.1% by weight |

Next, with this dispersion liquid and the method identical as embodiment 6, black matrix of a color cathode ray tube was formed and, thereafter, phosphor layers were formed.

The dispersion liquid of this embodiment, being excellent in its coating property to the panel, could form a light absorption layer of uniform thickness without producing irregularity. With thus prepared color cathode ray tube, the diffuse reflectance and the specular reflectance of the display surface were measured from the external surface side of the glass panel as same as embodiment 6. Those values were remarkably lower than those of the display surface of the existing color cathode ray tube. Thus, the reflectivity of the display surface was remarkably reduced to result in showing an improvement.

Embodiments 13 to 18

With the following compositions, dispersion liquids of solid solution of manganese oxide and ferric oxide were prepared.

[Composition of Dispersion Liquid (a)]

| | |
|---|---|
| $Mn_2O_3 \cdot Fe_2O_3$ (average particle diameter 400 nm) | 20.0% by weight |
| ammonium salt of methacrylic acid-dimethylamino-methyl methacrylate copolymer | 1.5% by weight |
| water | 78.4% by weight |
| alkyleneoxide denatured methylpolysiloxane | 0.1% by weight |

[Composition of Dispersion Liquid (b)]

| | |
|---|---|
| $Mn_2O_3.Fe_2O_3$ (average particle diameter 100 nm) | 20.0% by weight |
| ammonium salt of acrylic acid-ethoxy triethylene glycol methacrylate copolymer | 1.5% by weight |
| water | 78.5% by weight |

[Composition of Dispersion Liquid (c)]

| | |
|---|---|
| $Mn_2O_3.Fe_2O_3$ (average particle diameter 1000 nm) | 20.0% by weight |
| ammonium salt of methacrylic acid-dimethylamino-methyl methacrylate copolymer | 1.5% by weight |
| water | 78.4% by weight |
| alkyleneoxide denatured methylpolysiloxane | 0.1% by weight |

[Composition of Dispersion Liquid (d)]

| | |
|---|---|
| $Mn_3O_4.Fe_2O_3$ (average particle diameter 400 nm) | 22.0% by weight |
| ammonium salt of methacrylic acid-dimethylamino-methyl methacrylate copolymer | 1.3% by weight |
| water | 76.4% by weight |
| alkyleneoxide denatured methylpolysiloxane | 0.3% by weight |

[Composition of Dispersion Liquid (e)]

| | |
|---|---|
| $Mn_3O_4.Fe_2O_3$ (average particle diameter 100 nm) | 20.0% by weight |
| ammonium salt of acrylic acid-ethoxy triethylene glycol methacrylate copolymer | 1.0% by weight |
| water | 79.0% by weight |

[Composition of Dispersion Liquid (f)]

| | |
|---|---|
| $Mn_3O_4.Fe_2O_3$ (average particle diameter 1000 nm) | 20.0% by weight |
| ammonium salt of methacrylic acid-dimethylamino-methyl methacrylate copolymer | 1.5% by weight |
| water | 78.4% by weight |
| polyvinyl alcohol | 0.1% by weight |

Next, with this dispersion liquids and the method identical as embodiment 6, black matrices of color cathode ray tubes were formed and, thereafter, phosphor layers were formed. Dispersion liquids (a) to (f) were respectively used in embodiments 13 to 18.

The dispersion liquids of these embodiments, being excellent in its coating property to the panel, could form light absorption layers of uniform thickness without producing irregularity. With thus prepared color cathode ray tubes, the diffuse reflectance and the specular reflectance of the display surfaces were measured from the external surface sides of the glass panels as same as embodiment 6. Those values were remarkably lower than those of the display surface of the existing color cathode ray tube. Thus, the reflectivity of the display surfaces were remarkably reduced to result in showing an improvement.

Embodiment 19

With the $MnO_2$ dispersion liquid of the identical composition as that of embodiment 7 and the known method, black matrix was formed on a glass substrate of a field emission display (FED), and thereafter, phosphor layers of respective colors of red, green, and blue were formed. Thus, a light emitting side substrate was prepared. Then, this light emitting side substrate and an electron emitting side substrate in which electron emitting elements, gate electrodes were formed on a silicon substrate were disposed opposed each other, and were adhered by a sealing agent containing glass powder. After baked at a prescribed temperature in the range of 450 to 500° C. to seal, the space between the both substrates were made a high vacuum state.

With thus prepared FED, the diffuse reflectance and the specular reflectance of the display surface were measured from the external surface side of the glass substrate as same as embodiment 6. These values were remarkably lower than those of the existing FED. Accordingly, from the viewpoint of reflectivity of the display surface, the present embodiment was remarkably improved.

Embodiment 20

With a dispersion liquid of the composition identical as that of the $MnO_2.Fe_2O_3$ dispersion liquid employed in embodiment 10, similarly with embodiment 19, black matrix of a FED was formed, thereafter, phosphor layers were formed. Thus, a light emitting side substrate was prepared. Then, this light emitting side substrate and the electron emitting side substrate were disposed opposed each other to prepare a FED as same as embodiment 9.

With the FED thus prepared, the diffuse reflectance and the specular reflectance of the display surface were measured from the external surface side of the glass substrate as same as embodiment 6. These values were remarkably lower than those of the existing FED. In addition, these values were further lower than those of the FED prepared in embodiment 19. Accordingly, from the viewpoint of reflectivity of the display surface, the present embodiment showed an extreme improvement effect.

Embodiment 21

With a dispersion liquid of the composition identical as that of $MnO_2$ dispersion liquid employed in embodiment 7 and the known method, a light absorption layer was formed on a glass substrate of a front surface side of a plasma display panel (PDP), thereafter, a composite electrode, a dielectric layer, a protective layer or similar layer were formed in turn. Further, on a glass substrate of the rear surface side, by use of the known method, phosphor layers were formed. Then, by combining these substrates, a PDP was prepared.

Thus prepared PDP, compared with the existing PDP, was improved in its uniformity of the light absorption layer. Accordingly, from viewpoint of the uniformity of the display surface, it showed a remarkable effect.

Embodiment 22

With a dispersion liquid of the composition identical as that of the $MnO_2.Fe_2O_3$ dispersion liquid employed in embodiment 10, similarly with embodiment 21, a light absorption layer and phosphor layers were formed to prepare a PDP.

The PDP thus formed, compared with the existing PDP, was improved in uniformity of the light absorption layer, and still further improved in uniformity of the film compared with that of the PDP prepared in embodiment 21. Accordingly, from the point of view of uniformity of the display surface, it showed an extreme improvement effect.

Industrial Applicability

As described above, for the dispersion liquid composition of the present invention, as a light absorption substance, manganese oxide of which average particle diameter is controlled in the range of 50 to 2000 nm, or solid solution of manganese oxide and ferric oxide of which average particle diameter is controlled in the range of 50 to 2000 nm and of which manganese content is in the range of 15 to 70% by weight is employed. Further, such a light absorption substance is dispersed homogeneously in a solvent such as water by a dispersing agent such as sodium salt of water-soluble acrylic resin. Therefore, by coating the dispersion liquid on a transparent substrate such as a glass substrate, a light absorption layer of uniform thickness is formed. In addition, the light absorption layer is reduced in its diffuse reflectance and specular reflectance, respectively, and particularly, the latter one, that is, the specular reflectivity is remarkably reduced. Accordingly, in the display devices such as color cathode ray tube, PDP and FED, superposition of ambient light on a display surface is difficult to occur.

What is claimed is:

1. A dispersion liquid composition for black matrix suitable for use in a display device, said liquid composition comprising:
   a light absorptive substance consisting of manganese oxide having an average particle diameter in the range of 50 to 2000 nm, or a solid solution of manganese oxide and ferric oxide having an average particle diameter in the range of 50 to 2000 nm and a manganese content in the range of 15 to 70% by weight;
   at least one kind of dispersing agent selected from water-soluble acrylic resin, sodium salt, ammonium salt or potassium salt of water-soluble acrylic resin, and sodium salt, ammonium salt or potassium salt of polycarboxylic acid or ligninsulfonic acid or bisphenolsulfonic acid; and
   water, or a solvent mixture of water and an organic solvent compatible with water.

2. The dispersion liquid composition for black matrix as claimed in claim 1, wherein the manganese oxide is manganese dioxide.

3. The dispersion liquid composition for black matrix as claimed in claim 1, further comprising alkyleneoxide denatured methylpolysiloxane, or alkyleneoxide denatured dimethylpolysiloxane.

4. The dispersion liquid composition for black matrix as claimed in claim 3, wherein the alkyleneoxide denatured methylpolysiloxane, or alkylenoxide denatured dimethylpolysiloxane has an HLB value (hydrophile-lypophile-balance) in the range of 3 to 18.

5. The dispersion liquid composition for black matrix as claimed in claim 1, wherein the content of the manganese oxide or the solid solution of manganese oxide and ferric oxide is in the range of 0.5 to 60% by weight.

6. The dispersion liquid composition for black matrix as claimed in claim 1, wherein the dispersing agent is sodium salt or ammonium salt of water-soluble acrylic resin.

7. A display device, comprising a transparent panel, a light absorption layer disposed as black matrix on an interior surface of the panel, and a phosphor layer disposed on a rear side opposed to the panel with respect to the light absorption layer,
   wherein the light absorption layer comprises a light absorptive substance consisting of manganese oxide having an average particle diameter of 50 to 2000 nm, or a solid solution of manganese oxide and ferric oxide having an average particle diameter of 50 to 2000 nm and manganese content of 15 to 70% by weight.

8. A method of manufacturing a display device, comprising:
   forming a light absorption layer on an interior surface of a transparent panel, and forming a phosphor layer on a rear side opposed to the panel with respect to the light absorption layer
   wherein the forming of the light absorption layer comprises coating a dispersion liquid on an interior surface of the panel,
   wherein the dispersion liquid comprises light absorptive substance consists of manganese oxide having an average particle diameter in the range of 50 to 2000 nm, or solid solution of manganese oxide and ferric oxide having an average particle diameter in the range of 50 to 2000 nm and a manganese content in the range of 15 to 70% by weight, at least one kind of dispersing agent selected from water-soluble acrylic resin, sodium salt, ammonium salt or potassium salt of water-soluble acrylic resin, or sodium salt, ammonium salt or potassium salt of polycarboxylic acid or ligninsulfonic acid or bisphenolsulfonic acid, and water, or a solvent mixture of water and an organic solvent compatible with water.

9. The method as set forth in claim 8, wherein the dispersion liquid further comprises alkyleneoxide denatured methylpolysiloxane, or alkyleneoxide denatured dimethylpolysiloxane.

10. A dispersion liquid composition for black matrix consisting of:
    manganese oxide having an average particle diameter in the range of 50 to 2000 nm, or a solid solution of manganese oxide and ferric oxide having an average particle diameter in the range of 50 to 2000 nm and a manganese content in the range of 15 to 70% by weight;
    at least one kind of dispersing agent selected from water-soluble acrylic resin, sodium salt, ammonium salt or potassium salt of water-soluble acrylic resin, and sodium salt, ammonium salt or potassium salt of polycarboxylic acid or ligninsulfonic acid or bisphenolsulfonic acid; and
    water, or a solvent mixture of water and an organic solvent compatible with water; and,
    optionally, one or more of alkyleneoxide denatured methylpolysiloxane, alkyleneoxide denatured dimethylpolysiloxane, and polyvinyl alcohol.

11. The dispersion liquid composition for black matrix as claimed in claim 10, wherein the manganese oxide is manganese dioxide.

12. The dispersion liquid composition for black matrix as claimed in claim 10, wherein the alkyleneoxide denatured methylpolysiloxane, or alkylenoxide denatured dimethylpolysiloxane is present and has an HLB value (hydrophile-lypophile-balance) in the range of 3 to 18.

13. The dispersion liquid composition for black matrix as claimed in claim 10, wherein the content of the manganese oxide or the solid solution of manganese oxide and ferric oxide is in the range of 0.5 to 60% by weight.

14. The dispersion liquid composition for black matrix as claimed in claim 10, wherein the dispersing agent is sodium salt or ammonium salt of water-soluble acrylic resin.

15. A display device, comprising a transparent panel, a light absorption layer disposed as black matrix on an interior surface of the panel, and a phosphor layer disposed on a rear side opposed to the panel with respect to the light absorption layer,
    wherein the light absorption layer consists of manganese oxide having an average particle diameter of 50 to 2000 nm, or a solid solution of manganese oxide and ferric oxide having an average particle diameter of 50 to 2000 nm and manganese content of 15 to 70% by weight;

at least one kind of dispersing agent selected from water-soluble acrylic resin, sodium salt, ammonium salt or potassium salt of water-soluble acrylic resin, and sodium salt, ammonium salt or potassium salt of polycarboxylic acid or ligninsulfonic acid or bisphenolsulfonic acid; and water, or a solvent mixture of water and an organic solvent compatible with water; and, optionally, one or more of alkyleneoxide denatured methylpolysiloxane, alkyleneoxide denatured dimethylpolysiloxane, and polyvinyl alcohol.

16. A method of manufacturing a display device, comprising:

forming a light absorption layer on an interior surface of a transparent panel, and forming a phosphor layer on a rear side opposed to the panel with respect to the light absorption layer by coating a dispersion liquid on an interior surface of the panel, wherein the dispersion liquid consists of a light absorptive substance selected from manganese oxide having an average particle diameter in the range of 50 to 2000 nm, or solid solution of manganese oxide and ferric oxide having an average particle diameter in the range of 50 to 2000 nm and a manganese content in the range of 15 to 70% by weight, at least one kind of dispersing agent selected from water-soluble acrylic resin, sodium salt, ammonium salt or potassium salt of water-soluble acrylic resin, or sodium salt, ammonium salt or potassium salt of polycarboxylic acid or ligninsulfonic acid or bisphenolsulfonic acid, and water, or a solvent mixture of water and an organic solvent compatible with water, and optionally, at least one of alkyleneoxide denatured methylpolysiloxane, alkyleneoxide denatured dimethylpolysiloxane and polyvinyl alcohol.

* * * * *

UNITED STATES PATENT AND TRADEMARK OFFICE
CERTIFICATE OF CORRECTION

PATENT NO.      : 6,699,580 B1
APPLICATION NO. : 09/424905
DATED           : March 2, 2004
INVENTOR(S)     : Takeo Ito et al.

It is certified that error appears in the above-identified patent and that said Letters Patent is hereby corrected as shown below:

Title page:
(54) Change "DISPERSION COMPOSITION FOR BLACK MATRIX, DISPLAY, AND PROCESS, FOR PRODUCTION DISPLAY" to --DISPERSION LIQUID COMPOSITION FOR BLACK MATRIX AND DISPLAY DEVICE, AND MANUFACTURING METHOD THEREOF--

Column 1, lines 1-3, change "DISPERSION COMPOSITION FOR BLACK MATRIX, DISPLAY, AND PROCESS, FOR PRODUCTION DISPLAY" to -- DISPERSION LIQUID COMPOSITION FOR BLACK MATRIX AND DISPLAY DEVICE, AND MANUFACTURING METHOD THEREOF--.

Signed and Sealed this

Twelfth Day of June, 2007

JON W. DUDAS
*Director of the United States Patent and Trademark Office*